United States Patent
Venkataramanappa et al.

(10) Patent No.: US 10,467,058 B2
(45) Date of Patent: Nov. 5, 2019

(54) SANDBOXING FOR MULTI-TENANCY

(75) Inventors: Girish Mittur Venkataramanappa, Redmond, WA (US); Mandyam Kishore, Redmond, WA (US); Andreas Ulbrich, Kirkland, WA (US); Aarthi Rajmohan Saravanakumar, Redmond, WA (US); Chandra Prasad, Bellevue, WA (US); Yann Christensen, Seattle, WA (US); Dharma Shukla, Sammamish, WA (US); Amol Kulkarni, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 780 days.

(21) Appl. No.: 13/330,682

(22) Filed: Dec. 20, 2011

(65) Prior Publication Data

US 2013/0160115 A1 Jun. 20, 2013

(51) Int. Cl.
*G06F 9/50* (2006.01)
*G06F 11/34* (2006.01)
*G06F 21/53* (2013.01)

(52) U.S. Cl.
CPC ........ *G06F 9/5011* (2013.01); *G06F 11/3409* (2013.01); *G06F 21/53* (2013.01);
(Continued)

(58) Field of Classification Search
CPC .... G06F 9/5011; G06F 11/3409; G06F 21/53; G06F 2201/815; G06F 2201/86;
(Continued)

(56) References Cited

U.S. PATENT DOCUMENTS 7,490,353 B2 * 2/2009 Kohavi .......................... 726/22
7,921,299 B1   4/2011 Anantha et al.
(Continued)

OTHER PUBLICATIONS

Cormack, Justin, "Sandboxing for multi-tenant applications", Retrieved at <<http://blog.technologyofcontent.com/2011/04/sandboxing-for-multi-tenant-applications/>>, Apr. 6, 2011, pp. 1-7.
(Continued)

*Primary Examiner* — Azizul Choudhury
(74) *Attorney, Agent, or Firm* — Ray Quinney & Nebeker P.C; James Bullough

(57) ABSTRACT

Systems and methods according to various embodiments disclose a worker process manager adapted to spawn one or more worker processes on a server and to load an application on each of the worker processes. The worker process manager is adapted to isolate the one or more worker processes from each other and to control resource usage by the worker processes. A resource manager is adapted to detect applications that overuse system resources. The worker process manager is adapted to isolate worker processes and to control resource usage using one or more of the following techniques: least-privilege execution, messaging isolation, credentials isolation, data isolation, network isolation, fair share resource usage, and managed runtime security. Heuristic algorithms are used to detect applications that frequently overuse system resources that are unchargeable and that cause system unresponsiveness.

15 Claims, 3 Drawing Sheets

(52) U.S. Cl.
CPC .... *G06F 2201/815* (2013.01); *G06F 2201/86* (2013.01); *G06F 2201/88* (2013.01); *G06F 2209/504* (2013.01); *G06F 2221/2149* (2013.01); *Y02D 10/22* (2018.01)

(58) Field of Classification Search
CPC ........... G06F 2201/88; G06F 2209/504; G06F 2221/2149; Y02D 10/22
See application file for complete search history.

(56) References Cited

U.S. PATENT DOCUMENTS

| | | | |
|---|---|---|---|
| 8,051,152 B2 * | 11/2011 | Rehm et al. | 709/221 |
| 8,166,492 B2 * | 4/2012 | Fathalla | 719/331 |
| 8,196,205 B2 * | 6/2012 | Gribble et al. | 726/24 |
| 8,429,096 B1 * | 4/2013 | Soundararajan et al. | 706/12 |
| 8,429,097 B1 * | 4/2013 | Sivasubramanian et al. | 706/12 |
| 2004/0249947 A1 * | 12/2004 | Novaes et al. | 709/226 |
| 2005/0177635 A1 * | 8/2005 | Schmidt et al. | 709/226 |
| 2007/0130130 A1 | 6/2007 | Chan et al. | |
| 2008/0256564 A1 * | 10/2008 | Fathalla | 719/331 |
| 2009/0300263 A1 * | 12/2009 | Devine et al. | 711/6 |
| 2010/0125612 A1 | 5/2010 | Amradkar et al. | |
| 2010/0281014 A1 | 11/2010 | Weissman et al. | |
| 2011/0251992 A1 * | 10/2011 | Bethlehem et al. | 707/610 |

OTHER PUBLICATIONS

Chong, Fred, "Multi-tenancy and Virtualization", Retrieved at <<http://blogs.msdn.com/b/fred_chong/archive/2006/10/23/multi-tenancy-and-virtualization.aspx>>, Oct. 23, 2006, pp. 5.

Rane, Pradnyesh, "Securing SaaS Applications: A Cloud Security Perspective for Application Providers", Retrieved at <<http://www.infosectoday.com/Articles/Securing_SaaS_Applications.htm>>, Retrieved Date: Sep. 23, 2011, pp. 6.

Langley, Pat, "Learning Effective Search Heuristics", Retrieved at <<http://citeseerx.ist.psu.edu/viewdoc/download?doi=10.1.1.74.6325&rep=rep1&type=pdf>>, Proceedings of the Eighth international joint conference on Artificial intelligence, vol. 1, 1983, pp. 3.

Multi-Tenant, High-Density Container Service for Hosting Stateful and Stateless Middleware Components, U.S. Appl. No. 12/972,411, filed Dec. 17, 2010, pp. 20.

* cited by examiner

SANDBOXING FOR MULTI-TENANCY

BACKGROUND

For efficient utilization of server resources in a data center, as many applications as possible are loaded and executed on each server. The applications are associated with many different tenants or customers. Each application may be run in a separate operating system process. However, because the operating system resources are shared across these applications, this configuration may be a security and reliability risk. One application may accidentally or maliciously interfere with the operating system or with other applications running on the same server.

A malicious application can make security attacks, for example, by installing malware on the server, reading private data belonging to other applications, spoofing other applications such as by improperly using the credentials and certificates of the other applications, tampering with the operation of other applications by squatting on network ports assigned to the other applications and/or emitting false diagnostic messages for the other applications, and so on.

An application can make reliability attacks, for example, by over-consuming resources, such as CPU, memory, disk and other operating system resources, flooding the network with too much traffic, sending messages to other applications by various inter-process communication mechanisms, and so on. Such reliability attacks may starve properly operating applications of necessary resources and thereby cause those applications to slow down or fail.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments enable many applications belonging to different tenants (i.e. multi-tenancy) to run on a shared set of compute resources in a secure and reliable manner. Applications on a server are sandboxed to provide security and isolation for multi-tenancy. Sandboxing involves techniques used to harden the security boundary around a process to prevent it from affecting other processes or the operating system. Aspects of the sandboxing system include the following features.

Least-Privilege Execution.

The system executes applications with very low privileges. This prevents the applications from performing any administrative operations on the operating system.

Messaging Isolation.

The system prevents applications from intercepting keyboard, mouse or other user inputs. Applications are also prevented from posting thread messages to other applications or spawning new processes.

Credentials Isolation.

The system runs every application in the context of a different local user account. Credentials, such as certificates, are securely stored in stores associated with the user account.

Data Isolation.

The system configures access control lists to ensure that one application cannot read files belonging to another application.

Network Isolation.

The system reserves HTTP addresses and TCP listen addresses for each application. The system prevents each application from squatting on addresses that belong to any of the other applications. The system further limits each application's access to external network resources to a configured list of addresses.

Fair Share Resource Usage.

The system ensures each application a fair share of the CPU's operation and imposes quotas for memory and local file storage.

Managed Runtime Security.

A managed runtime host controls access to API calls and runtime libraries and limits access to a restricted group of calls and libraries to prevent arbitrary reliability attacks.

Detection and Elimination of Badly Behaved Applications.

The system employs heuristic algorithms to detect applications that frequently overuse system resources that are unchargeable and that cause system unresponsiveness.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
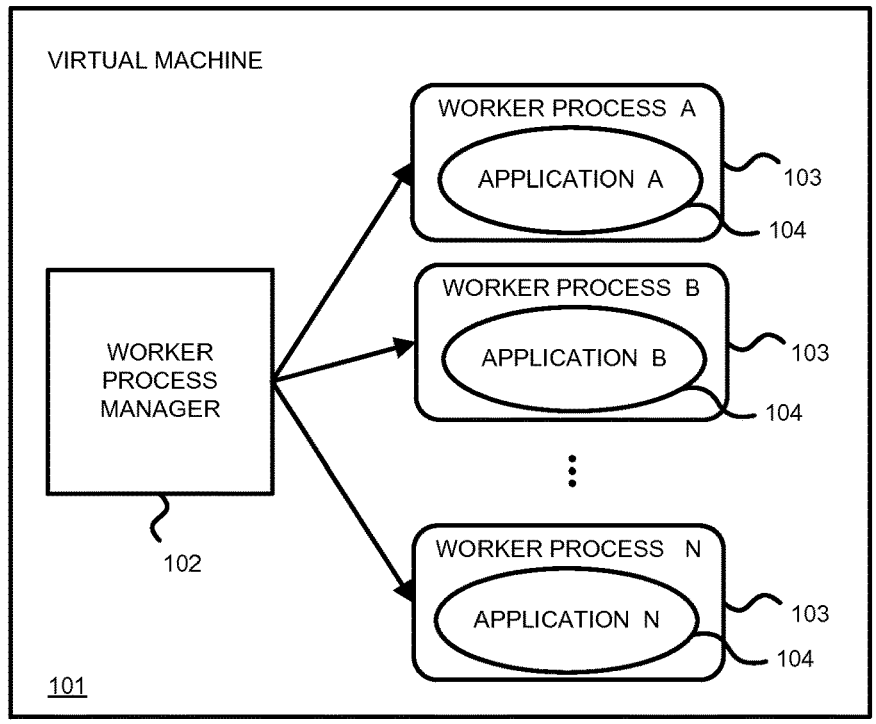
FIG. 1 is a block diagram illustrating a system for providing sandboxing for multi-tenancy according to one embodiment.

FIG. 1 is a block diagram illustrating a system for providing sandboxing for multi-tenancy according to one embodiment. Virtual machine 101 includes worker process manager 102 and a plurality of worker processes 103. Virtual machine 101 may represent a server in one embodiment. In other embodiments, a single server may support multiple virtual machines 101.

There is one worker process manager 102 per virtual machine 101. Worker process manager 102 runs with administrative privileges and full authority. Worker process manager 102 is responsible for spawning off one or more low-privileged, sandboxed worker processes 103. Worker process manager 102 also launches applications 104, which are loaded into the low-privileged worker processes 103. Worker process manager 102 communicates with each worker process 103 via secure named pipe connections and can send the worker processes 103 commands to start/stop or to check the health of the applications 104.

Figure 2:
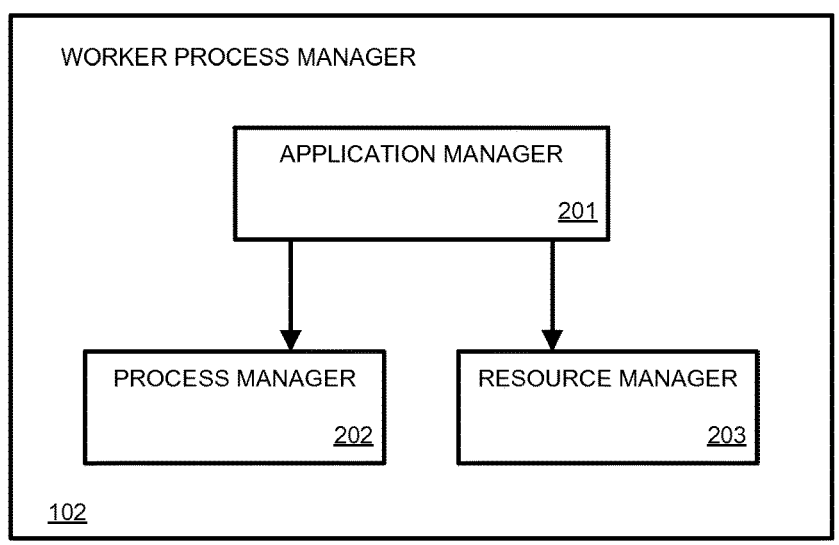
FIG. 2 is a block diagram illustrating the components of a worker process manager according to one embodiment.

FIG. 2 is a block diagram illustrating the components of a worker process manager 102 according to one embodiment. Application manager 201 is responsible for local deployment of applications, such as applications 104. In one embodiment, application manager 201 connects to an external store and deploys application on the file system of the virtual machine 101.

Process manager 202 is responsible for creating the worker processes, such as worker process 103, and establishing sandboxing between the worker processes. Process manager 202 also controls the worker process lifecycle. Resource manager 203 continuously monitors the sandboxed worker processes and resource usage metrics for the worker processes. Usage metrics may include, for example, CPU and memory usage by the worker processes.

Figure 3:
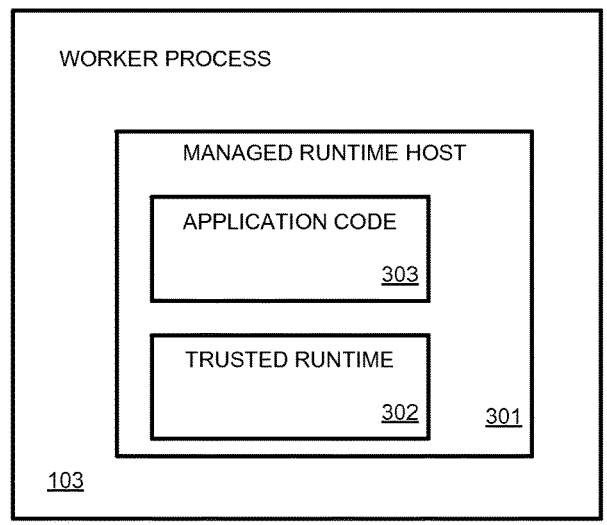
FIG. 3 is a block diagram illustrating the components of a worker process according to one embodiment.

FIG. 3 is a block diagram illustrating the components of a worker process 103 according to one embodiment. Managed runtime host 301 is responsible for loading a managed runtime. If the worker process will run a .NET application, for example, then managed runtime host 301 loads a .NET Common Language Runtime (CLR). If the worker process will run a Java script, then managed runtime host 301 loads a Java script engine into the worker process 103, for example.

Trusted runtime 302 provides useful services, such as a trusted library, to the application defined by code 303. For example, trusted runtime 302 for the .NET framework is made up of .NET system assemblies and other common infrastructure runtime assemblies that the user application needs including a .NET framework library. Trusted runtime 302 for a Java script host includes a Java script library. These trusted runtimes are appropriately code reviewed, tested and secure.

Each sandboxed worker process 103 is a unit of isolation on the virtual machine. In one embodiment, only one application 303 is loaded per worker process 103. Accordingly, at most one tenant or customer is allowed inside a worker process 103. One or more worker processes 103 may run on a server, which means that many applications can run on the same server to achieve high-density as well as multi-tenancy.

One or more of the following techniques may be used for hardening security and reliability in embodiments of a virtual machine or server.

Least Privilege Execution. A local-user account is created with a unique user name and a random password. A log-on session is established using this local-user account. This procedure returns a token, such as a WINDOWS® Process Token. The token is weakened by stripping off unnecessary system privileges and security group memberships. The weakened token is then used to spawn a worker process.

The resulting worker process executes with very low privileges, which prevents any application loaded inside the worker process from performing administrative operations on the operating system. After the worker process completes execution, the worker process' resources, such as the local-user account, are deleted and the system is restored to its original state. In an optional embodiment, the worker process may be spawned off in a separate session based on the configuration of the virtual machine or server.

Messaging Isolation.

Each worker process is isolated and the system prevents applications from intercepting keyboard, mouse, or other user inputs of an interactive user, posting thread messages to other applications, or copying data from a shared store.

In a WINDOWS® operating system embodiment, for example, a separate Window station and Desktop object are created and assigned to every worker process. The Desktop object represents a logical display surface and contains user interface objects. Window messages can be sent only between processes on the same desktop.

A separate windows Job object is created and assigned per worker process. The Job objects restrict a process from switching to a different Window station and desktop. By isolating each worker process in its own Window station and desktop, the system prevents applications from intercepting keyboard, mouse, or other user inputs of an interactive user, posting thread messages to other applications, or copying data from the interactive clipboard.

Credentials Isolation.

Credentials, such as Certificates, are deployed in a local certificate store and their private keys are secured via access control lists. As a result, an application can use only its own Certificate for signing and decryption. The application is not able to access or use the credentials or Certificate of another application.

Data Isolation.

A separate data folder is created on the file system and assigned to each application. These folders are secured via access control lists. As a result, an application can read and write to its own folder only. Applications are explicitly denied read and write permissions for other applications folder. In one embodiment, an application may use its folder to securely store its data.

Every worker process may be explicitly denied write access to other parts of the file system, including program files and operating system folders. This protects the operating system files and installed programs.

Similarly, in a WINDOWS® environment, all securable resources in WINDOWS® such as Registry, EventLog folders, WMI objects, Certificates, Http.Sys namespace reservations, DCOM objects and the like are secured via access control lists.

Network Isolation.

An administrative application is allowed to reserve http and https namespaces and secure them via access control lists such that only a particular account has privileges to use a secured namespace. Using this facility, every worker processes can be isolated by filtering via its user account so that the application within the worker process can communicate only over the set of Ports assigned to the worker process or application.

In a WINDOWS® environment, http and https endpoints are supported by a kernel mode service called http.sys. This acts as a port sharing service for http and https. An administrative application is allowed to reserve http and https namespaces and secure them via access control lists such that only a particular account has privileges to use a secured namespace. The worker process manager reserves namespaces in http.sys on behalf of the application in the sandboxed worker process. This prevents attacks where one application squats on an http or https namespace that is meant for another application.

In WINDOWS®, a subsystem called Windows Filtering Platform provides a means for filtering inbound and outbound TCP/IP traffic. It allows rules to be set up so that access to inbound or outbound traffic to specific IP:Port addresses can be blocked per user account.

Fair Share Resource Usage.

The worker process manager may use process-specific performance counters and event tracing to measure and track incoming and outgoing network input/output (IO) rates, read and write Disk I/O rates, and CPU and memory consumption per process. The worker process manger sends a warning notification to applications that exceed a preconfigured lower limit. The worker process manager terminates the application if it exceeds a predefined upper limit.

For CPU usage, applications may be throttled to prevent them from exceeding their fair share usage of the system resources. Throttling may be performed by dynamically altering the priority of a worker process between normal and idle priority levels depending on its CPU usage. If the CPU usage of a worker process is high, then its priority may be lowered so that other worker processes can have a chance to use the CPU. Similarly, if the CPU usage of a worker process is low, then its priority may be increased so that it has a chance to use more CPU capacity. In one embodiment, the throttling mechanism does not kick in unless the overall CPU consumption is more than 60%. The worker process manager itself runs with high priority to ensure that it gets enough CPU cycles to throttle other processes.

Additionally, the managed runtime restricts the number of threads that applications can create by mapping managed user mode threads to a small fixed number of native scheduler threads. These kernel threads perform the user mode scheduling of managed threads. Fixing the number of scheduler threads prevents the application from consuming a disproportionate share of CPU time through the creation of a large number of threads. At the same time the application is free to create as many managed user threads as desired.

For Network usage, applications may be throttled to prevent them from exceeding their fair share. Throttling is done per application by creating a Quality of Service (QoS) policy that assigns a fixed throttling rate for each of the destination port ranges that are assigned to the application.

The worker process manager may also impose quotas for working set and virtual memory for a worker process, such as by using WINDOWS® Job objects that provide these capabilities.

The Worker Process Manager may also impose local file storage quotas per worker process. For example, the WINDOWS® File System Resource Manager (FSRM) may be used to establish local file storage quotas. For data isolation purposes, every worker process is allowed write access to a specific folder and FSRM may be used to specify and apply quotas for these folders. When a quota is exceeded, the write operations from the process will fail.

Managed Runtime Security.

Some reliability attacks cause over-consumption of certain resources that are unchargeable (i.e., the consumed resources cannot be attributed to a specific process which makes it difficult to evaluate and ensure fair share resource usage). To prevent arbitrary reliability attacks, and for defense in depth, applications may be restricted from accessing all of the Win32 APIs by using mechanisms provided by the managed runtime host. For example, if the managed runtime host is .NET CLR, the .NET Partial Trust feature may be used to disallow access to arbitrary unmanaged API calls. If the managed runtime host is JavaScript, the list of allowed runtime libraries may be restricted to a safe white list.

The system may further rely on managed runtime mechanisms to prevent malicious applications from circumventing other mechanisms. For example, the system may force applications to use managed threads that can take advantage of user mode scheduling, thereby preventing the applications from creating native threads directly.

Detection and Elimination of Badly Behaved Applications.

As a last line of defense, the system employs heuristic algorithms to detect applications that frequently overuse system resources that are unchargeable and that cause system unresponsiveness.

Figure 4:
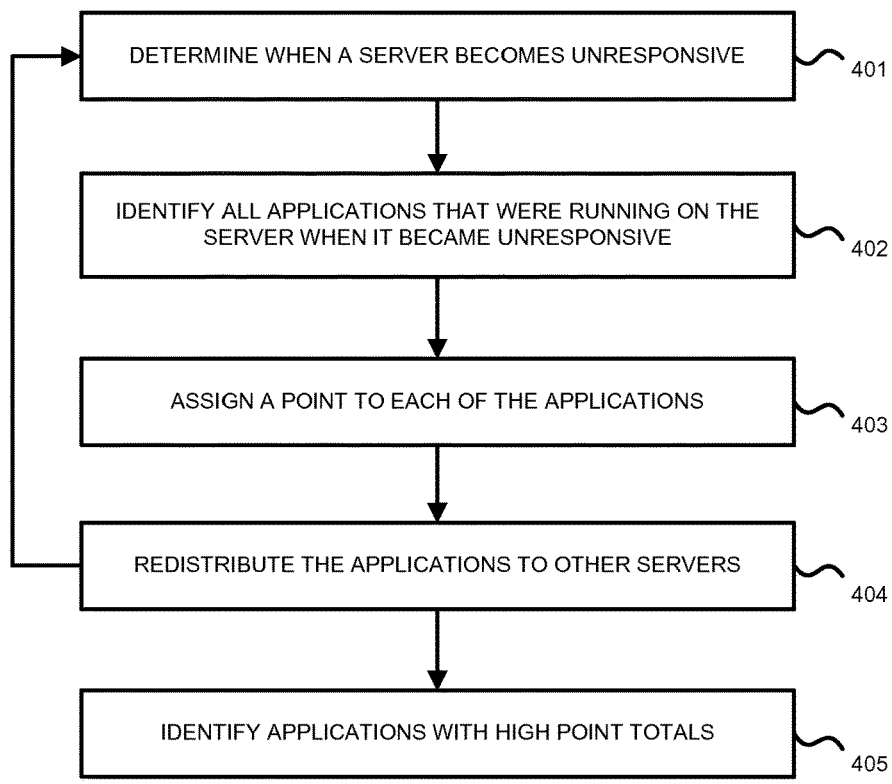
FIG. 4 is a flowchart illustrating a scoring system algorithm according to one embodiment.

FIG. 4 is a flowchart illustrating a scoring system algorithm according to one embodiment. In step 401, servers or virtual machines that have become unresponsive are identified. In step 402, all of the applications running on the server when it became unresponsive are identified. These applications may be considered suspect as they may have caused the server to become unresponsive. In step 403, a point is assigned to all of the applications that were running on the server at the time when the server became unresponsive. In step 404, the applications are redistributed to different servers. The process repeats from step 401 and the servers are monitored for additional failures. If another server fails, then all of the applications running on that server also receive a point and the applications are redistributed again. This process may repeat for several times. One or more applications that cause the servers to fail can be identified in step 405 by a high point total. The offending (i.e. high point total) applications may be undeployed to reduce future failures.

This process illustrated in FIG. 4 is a catch-all solution. Any undiscovered reliability threats in WINDOWS® or .NET will be identified and handled with this heuristic. The number of unresponsiveness events needed to detect the offending application is $[Log_x N+1]$ at worst, where N is the average number of applications per server and x is the number of servers used to redistribute the applications.

Figure 5:
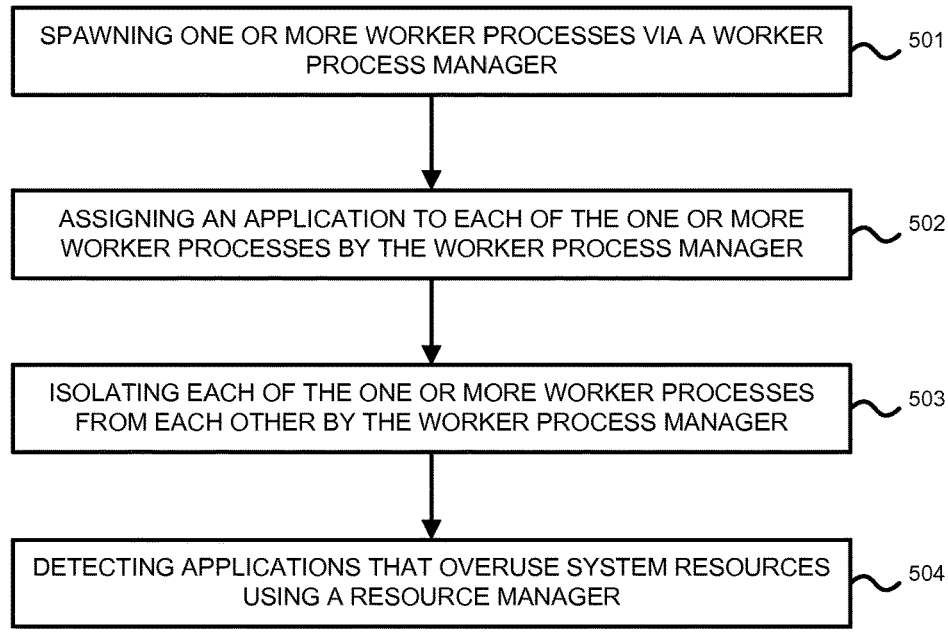
FIG. 5 is a flowchart illustrating a process for sandboxing applications and providing multi-tenancy on a server.

FIG. 5 is a flowchart illustrating a process for sandboxing applications and providing multi-tenancy on a server. In step 501, one or more worker processes are spawned via a worker process manager. In step 502, an application is assigned to each of the one or more worker processes by the worker process manager. In step 503, each of the one or more worker processes are isolated from each other by the worker process manager. In step, 504, applications that overuse system resources are detected using a resource manager.

It will be understood that steps 401-405 of the process illustrated in FIG. 4 and steps 501-504 of the process illustrated in FIG. 5 may be executed simultaneously and/or sequentially. It will be further understood that each step may be performed in any order and may be performed once or repetitiously.

Figure 6:
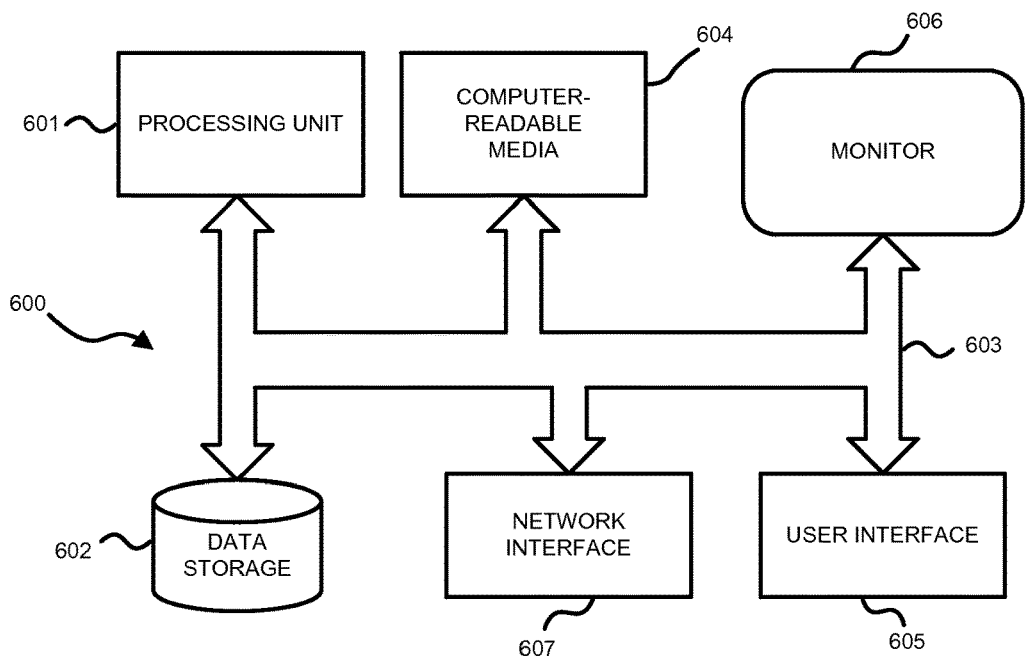
FIG. 6 illustrates an example of a suitable computing and networking environment.

FIG. 6 illustrates an example of a suitable computing and networking environment and hardware 600 on which the examples of FIGS. 1-5 may be implemented. The computing system environment 600 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 600. Components may include, but are not limited to, processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 typically includes a variety of computer-readable media 604. Computer-readable media 604 may be any available media that can be accessed by the computer 601 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 600.

A user may enter commands and information through a user interface 605 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 601 through a user input interface 605 that is coupled to the system bus 603, but may be connected by other interface and bus structures, such as a parallel port, game port or a universal serial bus (USB). A monitor 606 or other type of display device is also connected to the system bus 603 via an interface, such as a video interface. The monitor 606 may also be integrated with a touch-screen panel or the like. Note that the monitor and/or touch screen panel can be physically coupled to a housing in which the computing device 600 is incorporated, such as in a tablet-type personal computer. In addition, computers such as the computing device 600 may also include other peripheral output devices such as speakers and printer, which may be connected through an output peripheral interface or the like.

The computer 600 may operate in a networked environment using logical connections 607 to one or more remote computers, such as a remote computer. The remote computer may be a personal computer, a server, a router, a network PC, a peer device or other common network node, and typically includes many or all of the elements described above relative to the computer 600. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a LAN networking environment, the computer 600 may be connected to a LAN through a network interface or adapter 607. When used in a WAN networking environment, the computer 600 typically includes a modem or other means for establishing communications over the WAN, such as the Internet. The modem, which may be internal or external, may be connected to the system bus 603 via the network interface 607 or other appropriate mechanism. A wireless networking component such as comprising an interface and antenna may be coupled through a suitable device such as an access point or peer computer to a WAN or LAN. In a networked environment, program modules depicted relative to the computer 600, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A server, comprising:
   a processor; and
   a memory coupled to the processor, the memory including program instructions stored thereon that, upon execution by the processor, cause the server to:
      spawn one or more worker processes, via a worker process manager, and to load an application on each of the worker processes, the worker process manager configured to isolate the one or more worker processes from each other and to control resource usage by the worker processes using each of the following techniques: least-privilege execution, user input messaging isolation, security credentials isolation, data isolation, network resource isolation, fair share resource usage, and managed runtime security; and
      detect, via a resource manager, applications that overuse system resources.

2. The server of claim 1, wherein the resource manager is configured to detect applications that overuse system resources using a heuristic algorithm that comprises identifying suspect applications that were running when a host server becomes unresponsive, assigning a point to each of the suspect applications, distributing the suspect applications to other host servers, and monitoring points accumulated by the suspect applications to identify a suspect application having a greatest number of points.

3. The server of claim 1, wherein the least-privilege execution technique spawns a worker process using a process token that has minimal system privileges and security group memberships.

4. The server of claim 1, wherein the messaging isolation technique isolates each worker process in its own Window station and desktop object.

5. The server of claim 1, wherein the credentials isolation technique uses access control lists to secure certificates and private keys for use only by authorized applications.

6. The server of claim 1, wherein the data isolation technique uses access control lists to limit each application to using only its own data folder.

7. The server of claim 1, wherein the network isolation technique reserves http and https endpoints for each application and using access control lists to limit each application to using only its own reserved endpoints.

8. The server of claim 1, wherein the fair share resource usage technique sends warning notifications to applications that exceeds a first resource usage level and terminates applications that exceed a second resource usage level.

9. The server of claim 1, wherein the fair share resource usage technique throttles CPU usage by adjusting each application's priority level depending upon the application's historical CPU usage.

10. The server of claim 1, wherein the fair share resource usage technique throttles network usage using a quality of service (QoS) policy to control each application's access to destination port ranges assigned to the application.

11. The server of claim 1, wherein the managed runtime security technique restricts application access to predetermined allowed API calls and runtime libraries.

12. A method, comprising:
   spawning one or more worker processes via a worker process manager;
   assigning an application to each of the one or more worker processes by the worker process manager;
   isolating each of the one or more worker processes from each other by the worker process manager using each of the following techniques: least-privilege execution, user input messaging isolation, security credentials isolation, data isolation, network resource isolation, fair share resource usage, and managed runtime security; and
   detecting applications that overuse system resources using a resource manager.

13. The method of claim 12, wherein detecting applications that overuse system resources further comprises:
   determining when a server becomes unresponsive;
   identifying all suspect applications running on the server when the server becomes unresponsive;
   assigning a point to each suspect application;
   redistributing the suspect applications to different servers; and
   identifying a suspect application with the highest point total.

14. A computer program product for sandboxing applications on a multi-tenant server, the computer program product including computer-readable storage media having stored thereon computer-executable instructions that, upon execution by one or more processors of the multi-tenant server, cause the multi-tenant server to:
   spawn one or more worker processes via a worker process manager;
   assign an application to each of the one or more worker processes by the worker process manager;
   isolate each of the one or more worker processes from each other by the worker process manager using one or more of the following techniques: least-privilege execution, user input messaging isolation, security credentials isolation, data isolation, network resource isolation, fair share resource usage, and managed runtime security; and
   detect applications that overuse system resources using a resource manager.

15. The computer program product of claim 14, wherein to detect applications that overuse system resources, the computer-executable instructions, upon execution by the one or more processors, further cause the multi-tenant server to:
   determine when a server becomes unresponsive;
   identify all suspect applications running on the server when the server becomes unresponsive;
   assign a point to each suspect application;
   redistribute the suspect applications to different servers; and
   identify a suspect application with the highest point total.

* * * * *